(12) United States Patent
Gebotys

(10) Patent No.: US 7,720,225 B2
(45) Date of Patent: May 18, 2010

(54) TABLE SPLITTING FOR CRYPTOGRAPHIC PROCESSES

(75) Inventor: Catherine Helen Gebotys, Waterloo (CA)

(73) Assignee: Research In Motion Limited, Waterloo (CA)

( * ) Notice: Subject to any disclaimer, the term of this patent is extended or adjusted under 35 U.S.C. 154(b) by 1106 days.

(21) Appl. No.: 11/368,504

(22) Filed: Mar. 7, 2006

(65) Prior Publication Data

US 2007/0211890 A1 Sep. 13, 2007

(51) Int. Cl.
*H04K 1/02* (2006.01)
*H04K 1/00* (2006.01)
*H04L 9/00* (2006.01)

(52) U.S. Cl. .......................... 380/252; 380/42; 380/255; 380/263; 380/29

(58) Field of Classification Search .................. 380/42, 380/255, 263, 29, 252
See application file for complete search history.

(56) References Cited

U.S. PATENT DOCUMENTS

| | | | |
|---|---|---|---|
| 6,295,606 B1 | 9/2001 | Messerges et al. | |
| 6,419,159 B1 | 7/2002 | Odinak | |
| 6,658,569 B1 | 12/2003 | Patarin et al. | |
| 2001/0053220 A1 | 12/2001 | Kocher et al. | |
| 2003/0044003 A1* | 3/2003 | Chari et al. | 380/28 |
| 2004/0071291 A1 | 4/2004 | Romain et al. | |

OTHER PUBLICATIONS

Gebotys et al. "EM Analysis of Rijndael and ECC on a Wireless Java-Based PDA" Sep. 19, 2005, Lecture Notes in Computer Science, vol. 3659/2005, Springer Berlin/Heidelberg, pp. 263-264.*

Kocher, P., "Differential Power Analysis", CRYPTO'99, Lecture Notes in Computer Science, 1666, pp. 388-397, 1999, Springer-Verlag.

Chari et al., "Towards Sound Approaches to Counteract Power-Analysis Attacks", CRYPTO'99, Lecture Notes in Computer Science, 1666, pp. 398-412, 1999, Springer-Verlag.

Itoh, K. et al., "DPA Countermeasure Based on the "Masking Method"", Information Security and Cryptology—ICISC 2001, v 2288, 2002, pp. 440-456, XP002297044.

Messerges, T. S., "Securing the AES Finalists Against Power Analysis Attacks" Fast Software Encryption. International Workshop, vol. 1978, Apr. 2000, pp. 150-164, XP001040960.

Gladman, Brian, "A Specification for Rijndael, the AES Algorithm", v3.11, Sep. 12, 2003, pp. 1-37 (http://fp.gladman.plus.com/cryptography_technology/rijndael/aes.spec.311.pdf).

* cited by examiner

*Primary Examiner*—Christian LaForgia
*Assistant Examiner*—Joshua Watson
(74) *Attorney, Agent, or Firm*—Etienne de Villiers; Dimock Stratton LLP

(57) ABSTRACT

For a defined cryptographic process including an original substitution table, split masked substitution tables are provided to resist cryptographic attacks. The split masked substitution tables are defined with reference to a set of random value data words and a mask value. An entry in the split masked substitution tables is defined by selecting bits from the corresponding entry in the original masked substitution table, as masked by the corresponding one of the set of random value data words and by selecting bits from the corresponding one of the set of random value data words as masked by the mask value. The split masked substitution tables are usable in a modified cryptographic process based on the defined cryptographic process to permit a masked output to be generated. The split masked substitution tables are refreshed by each entry in the tables being refreshed upon access during execution of the modified cryptographic process.

15 Claims, 6 Drawing Sheets

TABLE SPLITTING FOR CRYPTOGRAPHIC PROCESSES

TECHNICAL FIELD

This invention relates generally to computing systems and, more particularly, to computing systems implementing encryption operations and countermeasures to resist attacks such as power analysis attacks on such operations.

BACKGROUND

Computing systems often require operations to be carried out in a secure manner. For embedded computing devices and for pervasive systems, security of operation is often crucial. To ensure operations and communications are secure, such systems employ cryptographic methods. The implementation of such a cryptographic method must itself be secure. However, cryptographic methods are subject to attacks. One type of non-invasive attack on computing devices implementing cryptographic methods is known as a power analysis attack. Another type of attack is based on electromagnetic analysis of the device carrying out a cryptographic process. Although the description below references power attacks, it will be appreciated that the countermeasures discussed are also applicable for electromagnetic analysis attacks.

A power analysis attack involves the monitoring of the power consumption of one or more components of a device while the device executes a cryptographic method. Statistical methods are subsequently used to derive information intended to be kept secret by the cryptographic method. Differential power analysis (DPA) is an example of a power analysis attack that may be used against cryptographic operations that include the indexing of one or more tables (substitution tables or "S-boxes) by a combination of secret key and plaintext values ("Differential Power Analysis", P. Kocher, CRYPTO'99, Lecture Notes in Computer Science, 1666, pp. 388-397, 1999, Springer-Verlag).

Different countermeasures to thwart such attacks have been suggested including frequent regeneration of tables using different random output masks ("Securing the AES Finalists Against Power Analysis Attacks", T. Messerges, FSE 2000, Lecture Notes in Computer Science, 1978, pp. 150-164, 2001, Springer-Verlag) using fixed value masking, where only a fixed number of masks is used ("DPA countermeasure based on the 'masking method'", K. Itoh et al., ICICS 2001, Lecture Notes in Computer Science, 2288, pp. 440-456, 2001, Springer-Verlag). However, the use of either regenerated tables or multiple masked tables or transformations requires additional memory, power and processor resources that are not always available and the allocation of which is typically not desirable.

Hence there is a need for cryptographic countermeasures which may thwart differential power and related attacks but which have low latency overheads.

BRIEF DESCRIPTION OF THE DRAWINGS

In drawings which illustrate by way of example only a preferred embodiment of the invention.

DETAILED DESCRIPTION

Figure 1:
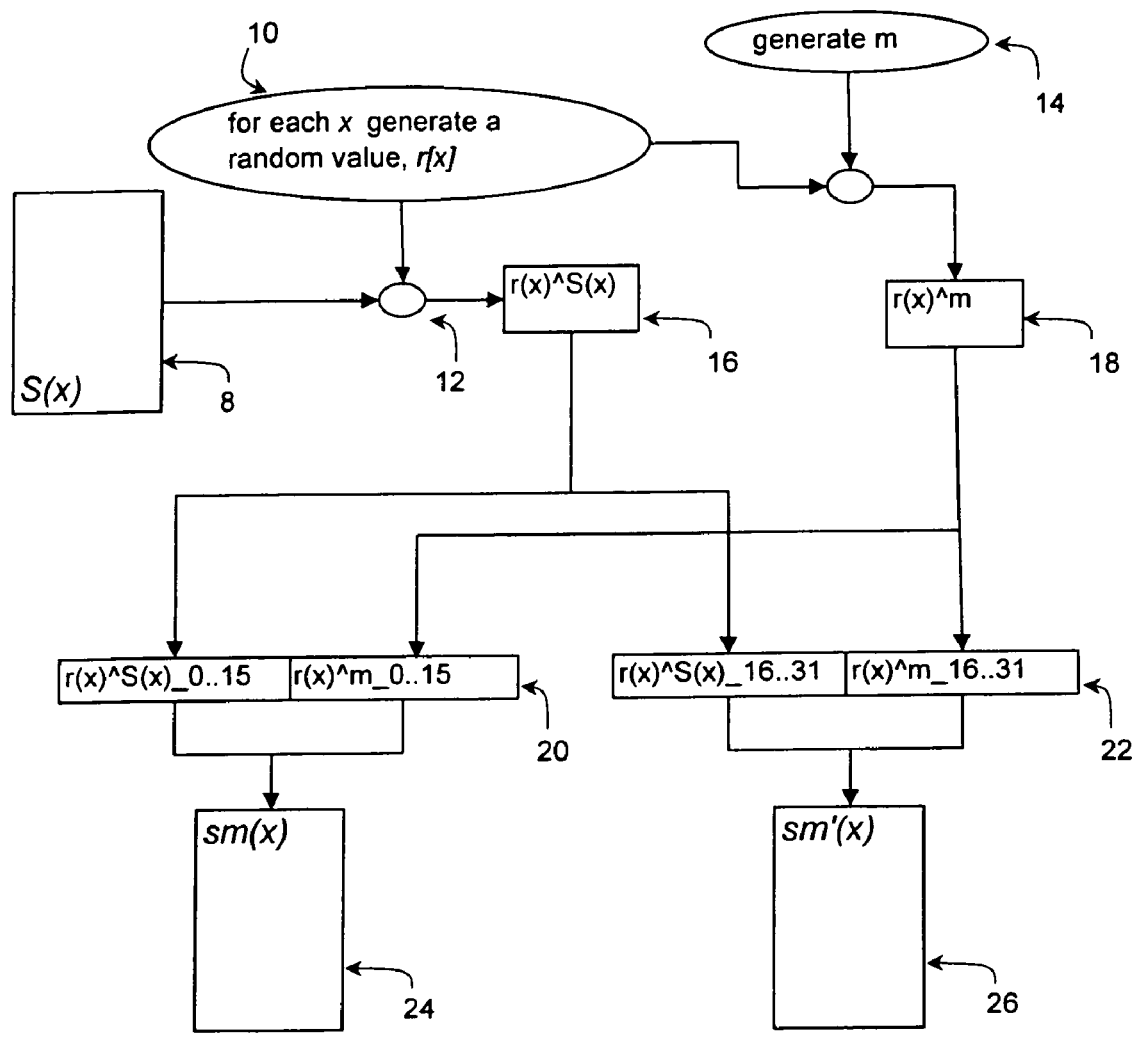
FIG. 1 is a block diagram illustrating a simple example of split table generation in accordance with the preferred embodiment.

According to an aspect of this invention there is provided an improved countermeasure for a cryptographic process or system.

According to a further aspect of this invention, there is provided a computing device implemented method for generating split masked tables for use in a cryptographic process, the cryptographic process being defined with respect to an original substitution table S(x) having data word entries S[x], each entry S[x] having a defined word length in bits, the method including the steps of: defining n sets of random value data words $r1(x)$... $rn(x)$, each data word having bits with defined bit locations, each set of random value data words including data word entries such that data words $r1[x], \ldots rn[x]$ correspond to entry S[x] in the original substitution table, defining a mask value, generating a set of split masked tables by, for each entry S[x], masking the data word S[x] with corresponding data words $r1[x], \ldots, rn[x]$ in the set of random values to define a masked data word having bits with defined bit locations, masking the mask value with a selected value $r1[x]$ of the corresponding set of random values to define a randomized mask data word for S[x], having bits with defined bit locations, and generating each of the entries in a split masked table by selecting bits from the masked data word, the randomized mask data word and, where the size n of the set of random values is 2 or more, the random value data words in the set other than the selected value $r1[x]$, whereby each selected bit used to define each split masked table entry is selected from a correspondingly defined bit-location in its original data word, each of the bits in the entry in the split masked substitution table being defined in accordance with a pre-selected pattern.

According to a further aspect of this invention, there is provided the above method in which the selection of bits from the masked data word, the randomized mask data word and, where the size n of the set of random values is 2 or more, the random value data words in the set other than the selected value $r1[x]$ is carried out by selecting contiguous bits from the data words and the step of generating each of the entries in a split masked table includes the step of concatenating the selected contiguous bits to form the entry.

According to a further aspect of this invention, there is provided the above method in which the size n of the set of random values is 1 and the length of the masked data word and of the randomized mask data word is 32 bits, the selection of bits including the step of selecting the first 16 bits from the masked data word and from the randomized mask data word to form an entry in a first split masked table by concatenation and a further selection of bits including the step of selecting the second 16 bits from the masked data word and from the randomized mask data word to form an entry in a second split masked table by concatenation.

According to a further aspect of this invention, there is provided a computing device implemented method for executing an enhanced cryptographic process resistant to cryptographic attack on the computing device, the enhanced cryptographic process including cryptographic steps based on a defined cryptographic process, the defined cryptographic process being characterized by accepting an input and generating an output, and utilizing one or more originally-defined substitution tables, the method including the following steps:
  defining a mask value,
  generating one or more sets of split masked tables corresponding to the one or more substitution tables, based on the mask value,
  for the input, executing cryptographic steps in the enhanced cryptographic process based on the defined cryptographic process by utilizing each of the sets of split masked tables, to generate a set of split masked table outputs, and
  combining the set of split masked table outputs to obtain a masked output corresponding to the output of the cryptographic process as masked by the mask value.

According to a further aspect of this invention, there is provided the above method further including the refresh step of refreshing each entry in each of the split masked tables upon the entry being accessed during execution of the cryptographic steps, the refresh step being accomplished by defining a random refresh data word and masking each bit in the split masked table entry by the appropriate bit in the random refresh data word.

According to a further aspect of this invention, there is provided the above method in which the step of combining the set of split masked table outputs includes a merge step followed by a reassembly step.

According to a further aspect of this invention, there is provided the above method in which the step of generating each of the sets of split masked tables for one of the originally defined substitution tables $S(x)$ includes, for data word entries $S[x]$, each entry $S[x]$ having a defined word length in bits, the following steps:
  defining n sets of random value data words $r1(x)\ldots m(x)$, each data word having bits with defined bit locations, each set of random value data words including data word entries such that data words $r1[x], \ldots rn[x]$ correspond to entry $S[x]$ in the original substitution table,
  generating the set of split masked tables corresponding to $S(x)$ by, for each entry $S[x]$,
  masking the data word $S[x]$ with corresponding data words $r1[x], \ldots, rn[x]$ in the set of random values to define a masked data word having bits with defined bit locations,
  masking the mask value with a selected value $r1[x]$ of the corresponding set of random values to define a randomized mask data word for $S[x]$, having bits with defined bit locations, and
  generating each of the entries in a split masked table by selecting bits from the masked data word, the randomized mask data word and, where the size n of the set of random values is 2 or more, the random value data words in the set other than the selected value $r1[x]$, whereby each selected bit used to define each split masked table entry is selected from a correspondingly defined bit-location in its original data word, each of the bits in the entry in the split masked substitution table being defined in accordance with a pre-selected pattern.

According to a further aspect of this invention, there is provided the above method in which the selection of bits from the masked data word, the randomized mask data word and, where the size n of the set of random values is 2 or more, the random value data words in the set other than the selected value $r1[x]$ is carried out by selecting contiguous bits from the data words and the step of generating each of the entries in a split masked table includes the step of concatenating the selected contiguous bits to form the entry.

According to a further aspect of this invention, there is provided the above method in which the size n of the set of random values is 1 and the length of the masked data word and of the randomized mask data word is 32 bits, the selection of bits including the step of selecting the first 16 bits from the masked data word and from the randomized mask data word to form an entry in a first split masked table by concatenation and a further selection of bits including the step of selecting the second 16 bits from the masked data word and from the randomized mask data word to form an entry in a second split masked table by concatenation.

According to a further aspect of this invention, there is provided the above method, further including the step of refreshing each entry in each of the split masked tables upon the entry being accessed during execution of the cryptographic process, the refresh step being accomplished by defining a random refresh data word and masking each bit in the split masked table entry by the appropriate bit in the random refresh data word whereby each bit in the entry corresponding to a bit selected from the masked data word, the randomized mask data word and, where the size n of the set of random values is 2 or more, the random value data words in the set other than the selected value $r1[x]$, is masked with the same bit from the random refresh data word.

According to a further aspect of this invention, there is provided the above method in which the defined cryptographic process is an AES encryption or decryption process.

According to a further aspect of this invention, there is provided a computing device program product for carrying out a cryptographic process so as to resist cryptographic attacks, the computing device program product including a computing device usable medium having computing device readable program product code embodied in the medium, the program code being executable by a processor of a computing device, apparatus and/or system for implementing the above methods.

According to a further aspect of this invention, there is provided a computing device, apparatus and/or system for executing an enhanced cryptographic process resistant to cryptographic attack, the enhanced cryptographic process including cryptographic steps based on a defined cryptographic process, the defined cryptographic process being characterized by accepting an input and generating an output, and utilizing one or more originally-defined substitution tables, the computing device, apparatus and/or system including:
  program code operative to define a mask value,
  program code operative to generate one or more sets of split masked tables corresponding to the one or more substitution tables, based on the mask value,
  for the input, program code operative to carry out cryptographic steps in the enhanced cryptographic process based on the defined cryptographic process by utilizing each of the sets of split masked tables, to generate a set of split masked table outputs, and program code operative to combine the set of split masked table outputs to obtain a masked output corresponding to the output of the cryptographic process as masked by the mask value.

According to a further aspect of this invention, there is provided a data processing system or network including at least one computing device, apparatus and/or system according to the above description.

Advantages of the preferred embodiment include increasing the resistance to a DPA attack or other similar cryptographic attack on a device implementing the preferred embodiment due to the parallelism of the encryption carried out in accordance with the preferred embodiment. In addition, the use of table splitting as described in the preferred embodiment makes a higher order cryptographic attack such as a DPA attack more difficult due to a reduction in the number of available samples. For example, a single power sample reflecting data including both a random mask bit and a masked table output bit is potentially obtainable, but such a single available sample may not be sufficient for a viable higher order DPA attack.

Advantages include the implementation of varying masks for substitution tables that incur reduced overhead costs in energy, performance and program code. Such limited overhead permits the use of this countermeasure approach with devices such as wireless mobile devices where security is required for the operations carried out by the devices but in which constraints on power and processor performance are potential concerns. Table values are re-masked as the values are accessed (in contrast to an approach that requires a full table regeneration step) and many random masks are potentially used.

Cryptographic operations implemented in computing devices may use substitution tables (S-tables or S-boxes). For example, in AES and in Triple DES (Triple Data Encryption Standard, or "3DES"), multiple S-boxes are utilized in the process of encryption of plaintext and in the decryption of cipher text. To provide countermeasures for security attacks on such cryptographic operations the input and the output of such substitution tables may be masked. The security provided by such a masking of the table output may, however, itself be subject to attack.

The preferred embodiment may be implemented as a computer program product that includes program code that operates to carry out the steps in the process described. The preferred embodiment may be implemented as a computer system (which includes a subsystem or system defined to work in conjunction with other systems) for encryption that includes elements that execute the functions as described. The computer system of the preferred embodiment may be defined by, and the computer program product may be embodied in, signals carried by networks, including the Internet or may be embodied in media such as magnetic, electronic or optical storage media. The process described may be implemented in a computing device as a method to be carried out by a combination of computing code and hardware embodied in the computing device (the process being in this case a computing device-implemented method). Computing devices on which the preferred embodiment is able to be implemented include full-featured computers or network equipment, for example. However, it is also contemplated that the preferred embodiment will be implemented on mobile devices such as wireless handheld mobile computing devices in which resources such as power, memory and processing capacity are constrained by desired limits on the size and weight of the devices. In a data processing device such as a wireless handheld mobile device it is advantageous to have data stored in an encrypted manner to prevent unauthorized access to information of the proper user. The preferred embodiment is intended to be implemented, for example, to prevent such encrypted data being made available to unauthorized individuals.

The preferred embodiment is described with reference to an example showing encryption steps for the AES encryption process. However, it will be appreciated that the preferred embodiment may be implemented with respect to decryption processes and to other cryptographic processes that include keys and substitution tables and for which countermeasures for attacks such as DPA are desirable. The substitution tables and the tables generated according to the preferred embodiment may be implemented using one of the different available data structures definable in a data store on a computing device such as a mobile communications device. As will be appreciated by those skilled in the art, the tables comprise a set of values, stored in a data store on a computing device, in accordance with a selected data structure. As is described below, the values making up the tables are represented as data words comprising bits, as is understood by those skilled in the art.

The masking referred to in the description of the preferred embodiment is carried out by the use of a bit-wise exclusive-or operation (XOR) typically carried out with respect to two defined data words. However, other masking operations may be used. For example arithmetic masking (involving the use of addition and/or subtraction in place of the exclusive-or operation) may alternatively be used.

According to the preferred embodiment, a set of split masked tables is generated based on an original substitution table (defined for use in a cryptographic process) and a mask value. The values in the split masked tables are generated such that the split masked tables may be used in place of the combination of the original substitution table and mask value in the cryptographic process. As is described, with a data reassembly step the output of the cryptographic process using the split masked tables will be the same as that achievable with the original substitution table and mask value.

Although the preferred embodiment contemplates the generation (and refreshing) of defined split masked tables which are generated as an initial step in a modified cryptographic process, it is understood that the split masked tables may be partially generated at one time or may be implemented such that the table entries are generated as required without the entire table being generated at one particular time. In any one of these implementations, the split masked substitution table entries will be available for use in the cryptographic process as is described in the case where the tables are initially defined and are persistently stored (with the refresh steps described below). Further, it will be understood that the random value data words and mask values referred to below may be defined by the preferred embodiment including a random-value generator or a pseudo-random value generator, or may be defined by the preferred embodiment system or method invoking an independent process or system for providing such random values.

FIG. 1 shows a simple example in which S(x), an original substitution table 8 (S-box), is used to generate a pair of split, masked substitution tables 24, 26 (sm(x) and sm'(x)) in accordance with the preferred embodiment. In the example referred to in FIG. 1, each entry S[x] in original substitution table 8 comprises a data word of length 32 bits. As is shown in block 10 of FIG. 1, according to the preferred embodiment, a set of random value data words r(x) is generated such that there is a random value data word r[x] for each entry S[x] in original substitution table 8. As the figure also shows, each random value data word r[x] is exclusive or'ed (at exclusive or 12) with the corresponding data word S[x] (in general in the Figures, the exclusive or operation is denoted by a small oval having two input values). Each of the set of random values r(x) is also combined with a single randomly-generated mask value m (the generation step is shown in block 14 in FIG. 1). The exclusive or of the data word r[x] with the data word value m (exclusive or 15), and the exclusive or of the data word r[x] with the original S-box value S[x] (12) form split table entry pairs 16, 18 (denoted S(x)^r(x), r(x)^m, respectively). In the preferred embodiment, the maskings described above are carried out for all values x in original substitution table S(x). As will be appreciated by those skilled in the art, it is possible to mask only some values in the original substitution table. However, with such an approach the strength of the countermeasure may be reduced or compromised.

In FIG. 1, the pair of split, masked tables 24, 26 is defined using the set of split table entry pairs 16, 18 as shown with respect to sm(x) and sm'(x). The FIG. 1 example distribution arrangement for the split table entry pairs is shown by the combination of (concatenation of) r[x]^S[x]_0 . . . 15 with r(x)^m_0 . . . 15 (shown as data word 20) and of r[x]^S[x]_16 . . . 31 with r[x]^m_16 . . . 31 (data word 22) as shown in FIG. 1. The notation "_x . . . y" denotes bits at positions x through y inclusive in a data word. Therefore, "r[x]^S[x]_0 . . . 15" represents the first 16 bits of the 32-bit data word for the value r[x]^S[x] and the notation "r[x]^S[x]_16 . . . 31" represents the last 16 bits of the same data word. Thus FIG. 1 shows the first 16 bits of each r[x]^S[x] data word being combined with the first 16 bits of each r[x]^m data word to create a 32-bit data word (shown as data word 20) which forms an entry in split, masked substitution table sm(x) (table 24). Similarly, FIG. 1 shows sm'(x) (table 26) being defined by data word 22 which is generated by concatenating the last 16 bits of the respective split table entry pairs 16, 18.

As is referred to above, each r[x]^S[x] value (16) has a data word representation as does each r[x]^m value (18). Each of the bits in each of the data words in the split table entry pair has a bit location within its data word. According to the preferred embodiment, bit pairs made up of one bit from each of the table entry pair, each having correspondingly selected and equivalent source bit locations, are placed in the same word in one of the split masked substitution tables. In other words, if a bit at bit location i from the data word for the value r[x]^S[x] is placed in a data word in sm[x], then for proper split mask table definition the corresponding bit (location i) from r[x]^m is placed in the same data word in sm[x]. The same condition pertains to the definition of split masked substitution table sm'(x) in the example of FIG. 1.

As is apparent, for the simple example shown in FIG. 1, the constraint set out above is met. The word forming a table entry for a split masked table is generated by a concatenation of one half of the split table entry data word pair with the corresponding half of the other data word in the split table entry pair. However, the preferred embodiment is not limited to this particular distribution arrangement of the bits from the split table entry pairs to form data words for the entries in the split mask substitution tables. Rather, as long as the distribution arrangement is carried out in a defined manner (effectively according to a pre-selected pattern) permitting reassembly of the data as described below, and as long as the condition set out above for proper split mask table definition is satisfied, the bits in the entries in split masked substitution tables may be arranged to take on any desired pattern. The simple concatenation of bits from the split table entry pair as shown in FIG. 1 need not be used to define the location of bits in the words of each split mask table, although such an arrangement or pre-selected pattern has the advantage of simplicity.

The split masked substitution tables defined or generated in accordance with the preferred embodiment are able to be used in cryptographic processes in which the original substitution table was usable with a mask value. The split masked tables are provided with input as is otherwise defined in the cryptographic process. The output of the split masked tables will, taken together, be data values whose data word length is larger than the data word length of the output of a single (not split) substitution table. Consequently, where split masked tables are used, there are data reassembly steps taken, in addition to the originally defined cryptographic process steps, to obtain the output expected from the cryptographic process. These steps involve the bits in the output data being appropriately exclusive or'ed with each other. On a bit-wise basis, this exclusive or operation provides a value that is based on the masking of the original substitution table. A further step is carried out for reassembling the set of such bits to place them in order corresponding to the original bit order of the data words input to the substitution table. This reordering is based upon the pre-selected pattern that was used to generate the various data words defining the split masked substitution tables.

Figure 2:
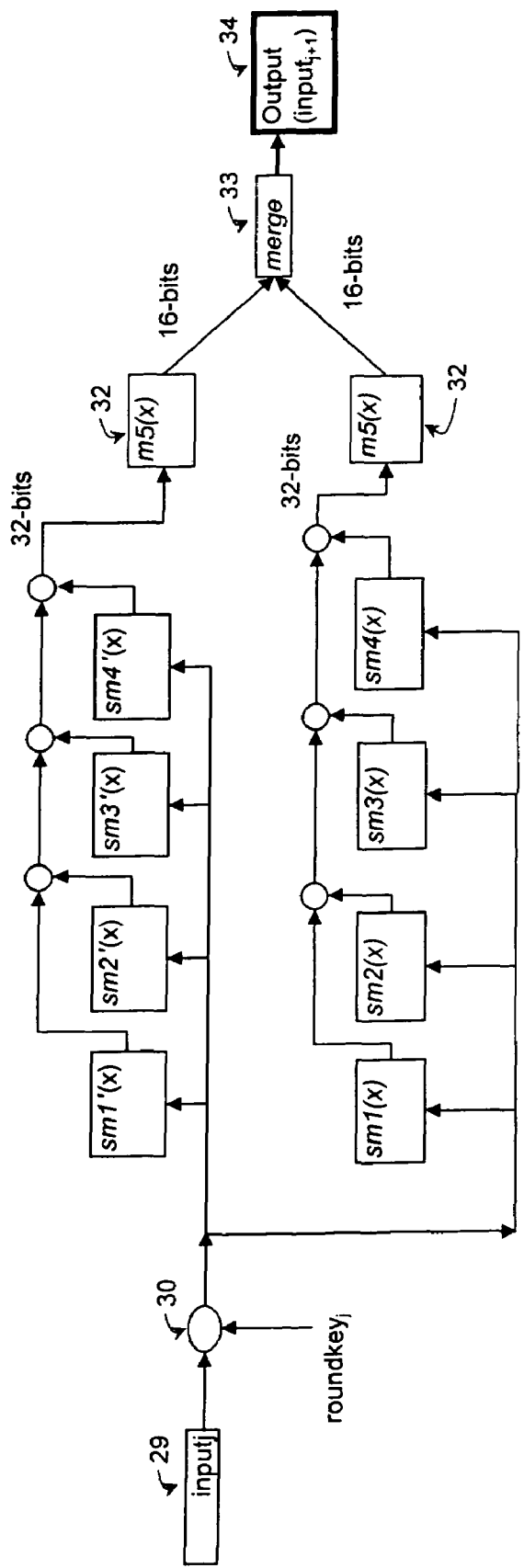
FIG. 2 is a block diagram illustrating a use of split tables in accordance with the preferred embodiment in an AES (Advanced Encryption Standard) encryption process.
Figure 3:
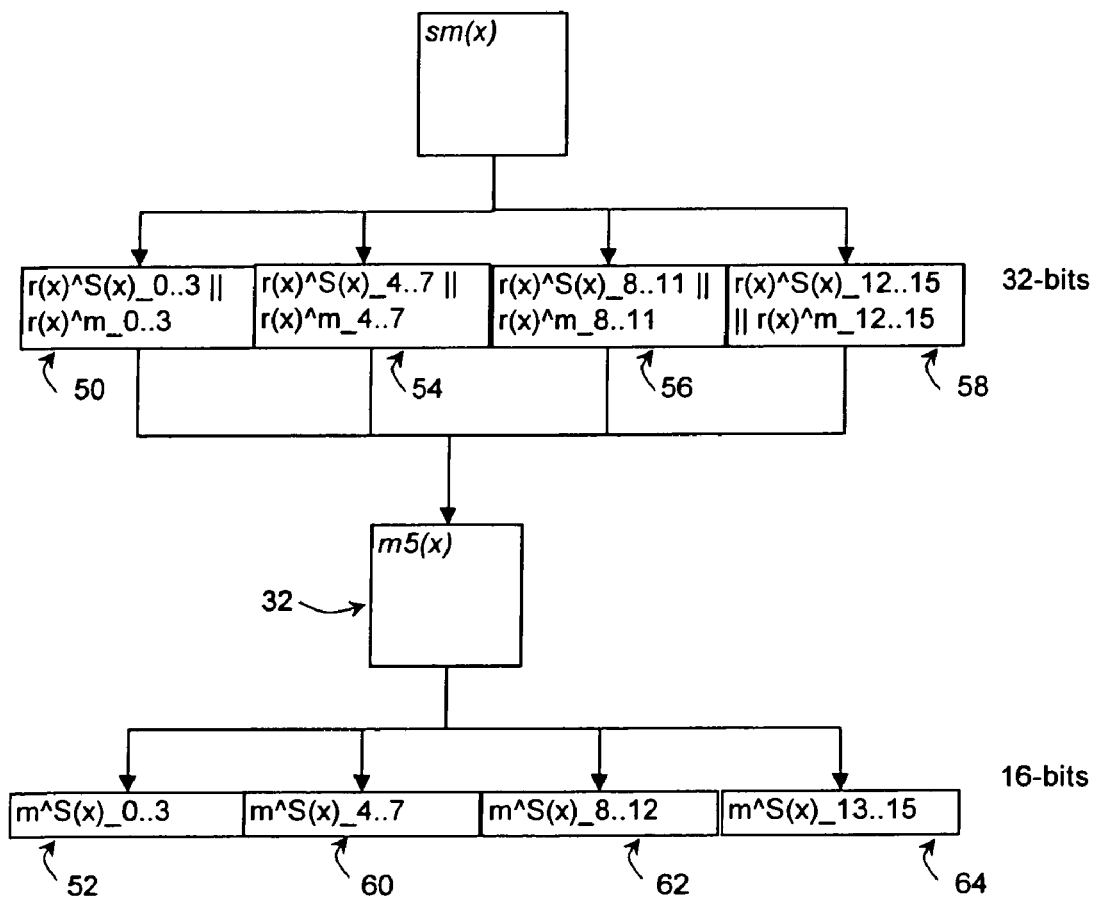
FIG. 3 is a block diagram illustrating a simple example of the recombination of data from a masked table in accordance with the preferred embodiment.

An example of both the use of split masked substitution tables and of the reassembly of the output data based on the distribution arrangement of the bits in those tables is shown in FIGS. 2 and 3. FIG. 2 is a block diagram that shows a high-level representation of an example of the preferred embodiment as applied to certain AES encryption steps (using table implementation of AES for high performance as described in Dr. Brian Gladman, "A Specification for Rijndael, the AES Algorithm", at fp.gladman.plus.com/cryptography_technology/rijndael/aes.spec.311.pdf, 15 Apr. 2003 (pages 18-19).). FIG. 2 shows input$_j$ (29) for a set of four substitution tables (the value sj/tj in the table implementation of AES referenced above). The substitution tables for the AES encryption process are represented in the FIG. 2 example by the split masked tables sm1(x), sm2(x), sm3(x), sm4(x) and corresponding split masked tables sm1'(x), sm2'(x), sm3'(x), sm4'(x). The AES cryptographic process as described in Gladman, above, calls for four different substitution tables (S1, S2, S3, S4, not shown). These four tables are subject to a split masking operation (as suggested in FIG. 1). The result is the two sets of split masked substitution tables shown in FIG. 2.

In the FIG. 2 example the words in the split masked tables are 32-bits in length and each of the pairs of split masked tables (sm1(x) and sm1'(x) and so forth) are defined as described above with respect to the split masked table generation shown in FIG. 1. As may be seen in FIG. 2, the AES input values are applied to each of the two sets of split masked tables and the encryption is carried out in accordance with the AES process for each of the two sets of tables. The output from each of the two sets of split masked substitution tables is a 32-bit word value. The 32-bit output data words are each applied as input to a merge table denoted m5(x) (table 32 shown in FIG. 2). This merge table is constructed to merge the bits in the 32-bit output data words by exclusive or'ing the bits that have been processed by (exclusive or'ed by) the r[x]^S[x] values with the corresponding bits processed by the r[x]^m values. By the table being defined to carry out this operation for two bits in the word, the resulting bit value will be effectively processed by the value m^S[x]. Consequently, the effect is the same as if the masked substitution value (m^S[x]) had been applied to the input, without that masked value having been directly applied to the input.

The output of each of the two copies of the m5(x) table 32 as shown in FIG. 2 will be a word having half the bit-length of the 32-bit data words generated by each set of the split masked substitution tables. In the example of FIG. 2, the output of each copy of m5(x) table 32 is a data word with a bit-length of 16. The merge box 33 in FIG. 2 illustrates a further reassembly step by which the bits for each data word are placed into their correct bit-order for the output (34) of the masked substitution table process. In the example of FIG. 2, the correct bit-order is defined by concatenating the two resulting data values together as the data words in the split masked tables are defined by the concatenation operation. As indicated above, other more complex patterns of bits may be used in defining the split masked tables and in such cases, the appropriate mapping of bits required will be carried out in merge step 33 shown in FIG. 2.

The details of the operation of m5(x) table 32 are shown in the block diagram of FIG. 3. The m5(x) table 32 takes an 8-bit data word as input and produces a 4-bit data word as output (FIG. 2 shows m5(x) table 32 used to accept 32-bit input and to produce 16-bit output—achievable by repeated operation of m5(x) table 32 as described below).

In FIG. 3 the symbol || represents the concatenation operation. The example of FIG. 3 shows input for m5(x) table 32 being defined by a set of 16 bits representing the value r[x]^S[x] and a further 16 bits representing the values r[x]^m. The bits are arranged as shown in FIG. 3. The m5(x) table 32 for this example is defined to operate by accepting an 8-bit input and outputting a 4-bit value. The 4-bit value is generated by exclusive or'ing the corresponding bits of the r[x]^S[x] and the r[x]^m values. For example, in FIG. 3 8-bit byte 50 is input to m5(x) table 32 to produce 4-bit byte 52. As will be seen in FIG. 3, there are four separate segments 50, 54, 56, 58 of a 32-bit data word that represent the output of a split masked substitution table shown as sm(x) in FIG. 3. FIG. 3 shows the values that are exclusive or'ed with inputs to split masked substitution table sm(x), defined as shown in FIG. 1. Table sm(x) is defined by r(x)^S(x)||r(x)^m as is described above for FIG. 1. Thus the first 8-bit byte 50 is a value that represents the table input exclusive or'ed with value r(x)^S(x)_0 . . . 3 and with r(x)^m_0 . . . 3, concatenated. When the two parts of the 8-bit byte 50 are exclusive or'ed with each other, the result is 4-bit byte 52 that is equivalent to the input value exclusive or'ed with m^S(x)_0 . . . 3. FIG. 3 shows the other 8-bit bytes 54, 56, 58 which are defined in a similar manner to byte 50.

As is shown in FIG. 3, the result of repeated operation of m5(x) table 32 on bytes 50, 54, 56, 58, is a 16-bit word made up of 4-bit bytes 52, 60, 62, 64. The entire resultant data word is therefore equivalent to the input exclusive or'ed with m^S[x], the original substitution table entry, masked with value m.

Figure 4:
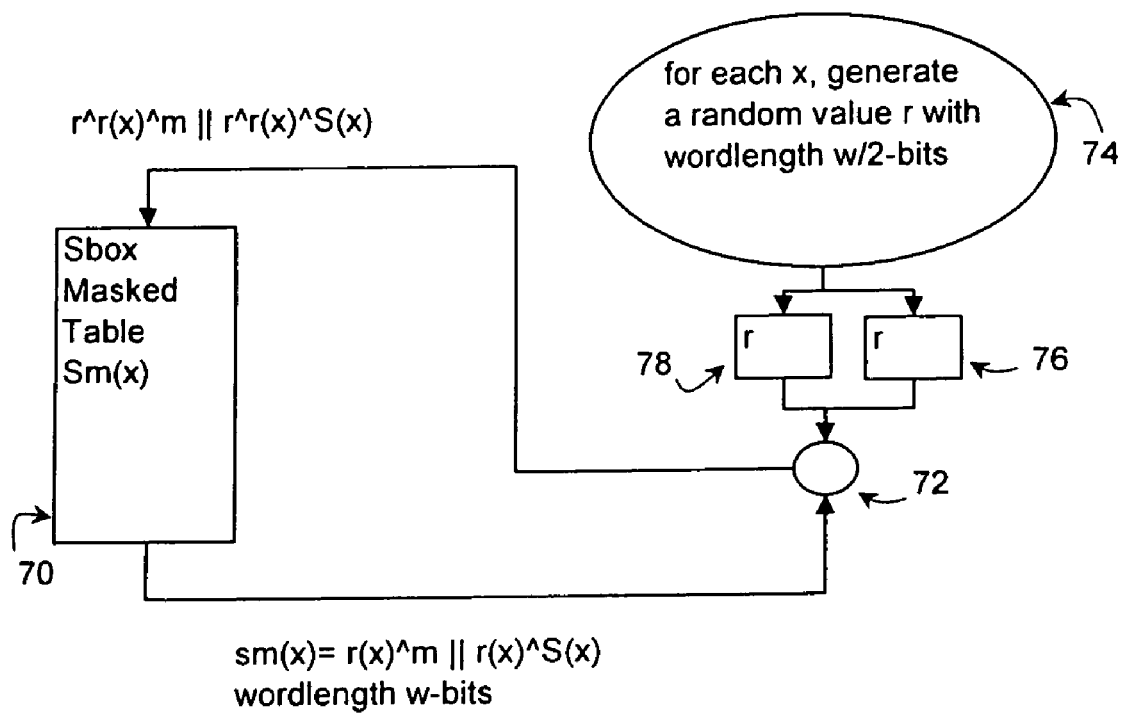
FIG. 4 is a block diagram illustrating the step of refreshing values in a split table in accordance with the preferred embodiment.

FIG. 4 shows the manner in which a split masked substitution table 70 of the preferred embodiment may be refreshed without requiring a full table regeneration step. The preferred embodiment provides that on each access of a table entry in split masked substitution table 70 that table entry will be refreshed using a random masking step (the exclusive or shown as oval 72). In FIG. 4, split masked substitution table 70 is shown with an entry sm[x] being defined as r[x]^S[x]||r[x]^m having word length w-bits. Following access of entry sm[x], the entry value is masked by a randomly generated value r (as shown in elements 74, 76, 78 in FIG. 4) to provide a new, refreshed value for the table entry defined as r^r[x]^S[x]||r^r[x]^m. As will be appreciated, because both parts of the concatenated value are masked by the same random value r, the masking of the refreshed value may be effectively removed in a straightforward manner. A reassembly step carries out an exclusive or of the bits in the table entries and consequently the masking of the refreshed value r will be cancelled out.

The above approach permits the values in the split masked substitution tables to be refreshed without the necessity to replace or regenerate the full table at any one time. The number of randomly defined masks will be potentially large as new masks are defined for each refresh step after split masked substitution table access.

The description above relating to FIGS. 1 and 2 shows how two split masked substitution tables may be generated from a single original substitution table using the method and system of the preferred embodiment. However, more than two split masked substitution tables may be generated from a single original substitution table. In the preferred embodiment, the maximum practical number of split masked substitution tables that can be generated from a single original substitution table will depend on the data word length used in the encryption process in which the tables will be employed.

Figure 5:
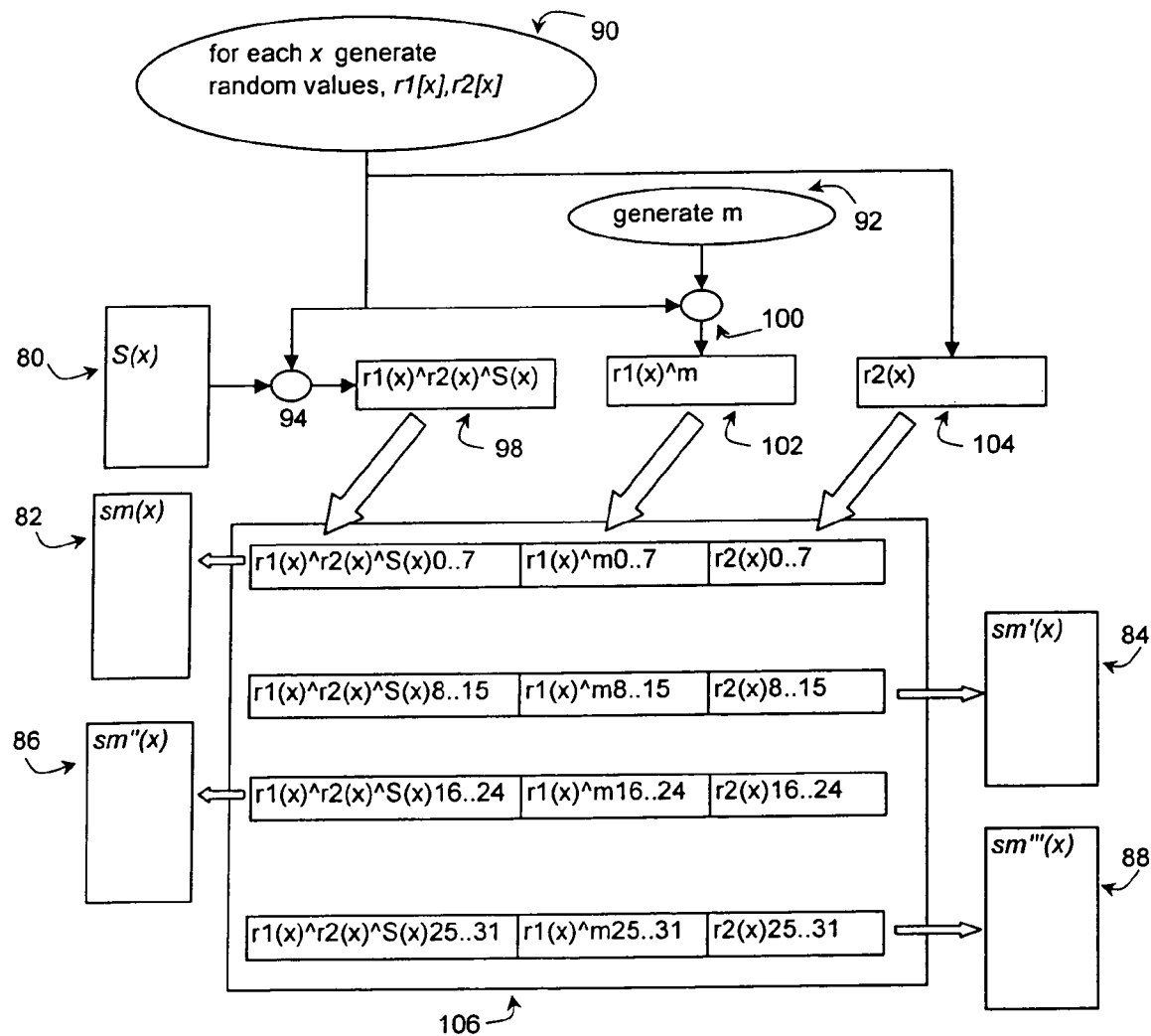
FIG. 5 is a block diagram showing an example of the preferred embodiment in which a single original substitution table and two sets of random values are used to generate four split masked substitution tables.

FIG. 5 shows a further example in accordance with the preferred embodiment in which a single original substitution table 80 is used to generate four split masked substitution tables 82, 84, 86, 88 (sm(x), sm'(x), sm''(x) and sm'''(x), respectively). In the example of FIG. 5, there are two sets of random values r1(x), r2(x) generated (at generator 90) and a single masking value m generated (at generator 92).

The four split masked substitution tables 82, 84, 86, 88 are defined, in the example of FIG. 5, using a combination of masked bits and unmasked random bits as is shown in the figure. Each entry S[x] in original substitution table 80 is masked with both the values r1[x] and r2[x], as generated for that entry S[x]. This is shown by the exclusive or operation at 96 resulting in value r1[x]^r2[x]^S[x] shown at masked data word 98 in FIG. 5. Further, each r1[x] is masked with value m, as shown at exclusive or 100 resulting in randomized mask data word 102 with value r1[x]^m. The second set of random values r2(x) is used without masking (see data word 104) in the generation of values in the split masked substitution tables 82, 84, 86, 88.

In FIG. 5, the combination of values to generate the split masked tables 82, 84, 86, 88 is shown schematically at 106. As will be appreciated, the steps at 106 may be carried out by successive operations of computing device program code or may be carried out by appropriately designed hardware components. Data words 98, 102 and 104, defined as described above for each entry in original substitution table 80, are each split into four parts and those parts combined to generate the split tables.

For the FIG. 5 example, as is shown at 106, the first eight bits of each of data words 98, 102, 104 are combined to provide the appropriate 24-bit word entry in table sm(x) (split masked substitution table 82). The entry generated for sm(x) is defined as shown in data word 108: the concatenation of the first eight bits of r1[x]^r2[x]^S[x], of r1[x]^m, and of r2[x]. Similarly, entries for split masked substitution tables 84, 86, 88 are defined by data words 110, 112, 114 which reflect the concatenations of the second, third and fourth 8-bit portions of r1[x]^r2[x]^S[x], of r1[x]^m, and of r2[x], respectively, as shown in FIG. 5.

As can be seen, this approach to the generation of the split masked substitution tables of the preferred embodiment will potentially produce split masked tables having word lengths different from the original substitution table. This can be seen in the example of FIG. 5, in which original substitution table 80 has 32-bit data word entries S[x] while the resultant split masked substitution tables 82, 84, 86, 88 each have 24-bit data word entries. In certain cryptographic operations, such a change in data word length for the entries in the substitution tables may not be significant.

As will be appreciated, the selection of a particular number of random value sets (i.e. r1($x$), r2($x$), ...) will affect the way in which the masking operations are carried out according to the preferred embodiment. If there are n such sets (corresponding to r1($x$), ... rn($x$) random value sets) then there is a first masking operation defined by r1($x$)^ ... rn($x$)^s($x$). The resulting data word is then divided across the data words used in generating the split masked substitution tables. To allow for the combination of data words to provide the effect of masking the original substitution table (S($x$)^m), the preferred embodiment utilizes an even number of split masked substitution tables.

Figure 6:
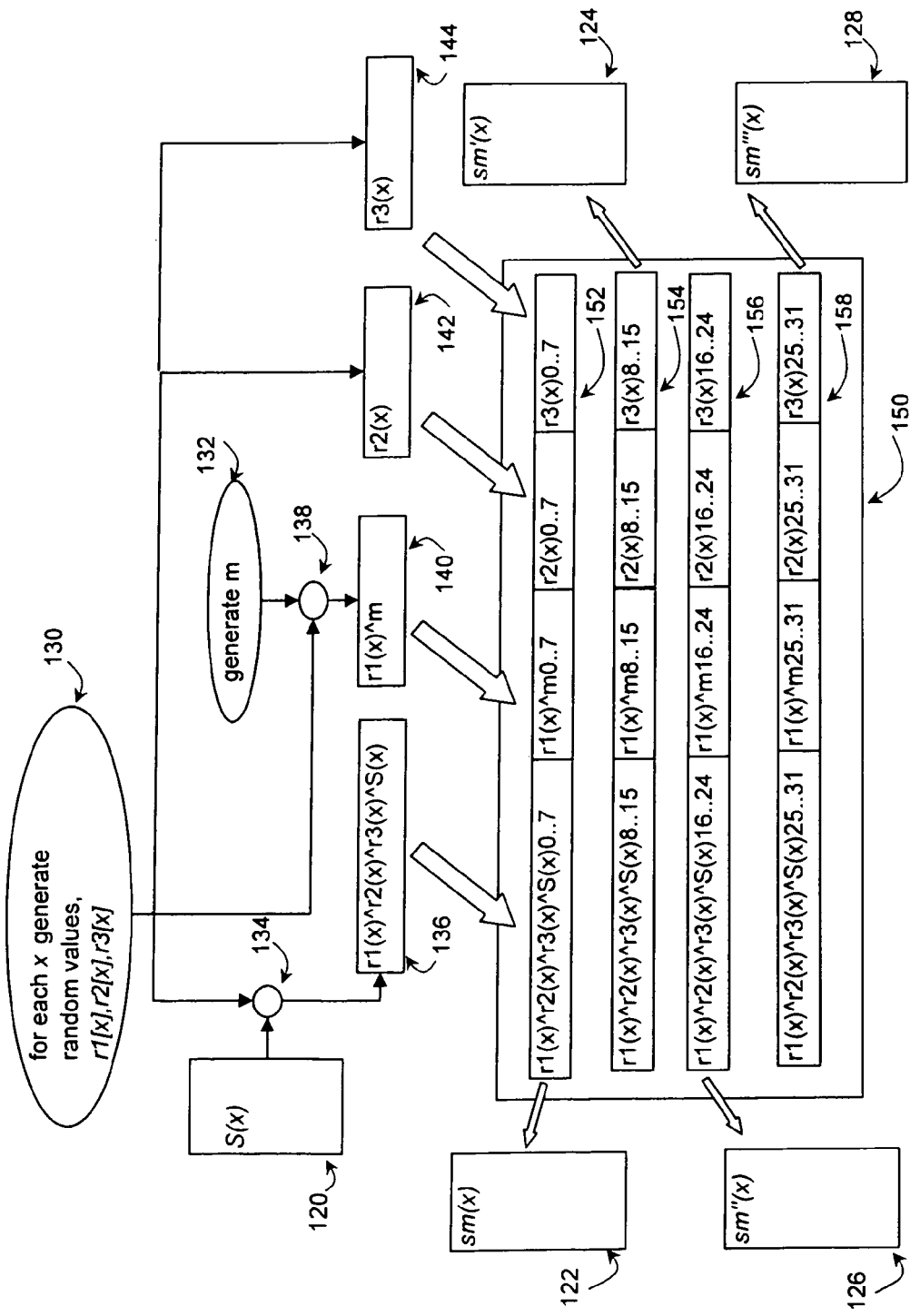
FIG. 6 is a block diagram showing an example of the preferred embodiment in which a single original substitution table and three sets of random values are used to generate four split masked substitution tables.

Consequently, when the number of sets of random values, n, used is either 1 or 3, then n+1 substitution tables are required. For example n=1 refers to the case in FIGS. 1 and 2 utilizing random value set r($x$) and requiring only two split masked substitution tables (sm($x$) and sm'($x$)). The case with 3 sets of random values, r1($x$),r2($x$),r3($x$), is illustrated in FIG. 6, as is described in more detail below. When an even number n=2, 4 of random value sets is utilized, (n+2) substitution tables are required. For example n=2 refers to the case just described, where sets of random values are represented by r1($x$) and r2($x$) as shown in FIG. 5 and in which four split masked substitution tables are generated.

FIG. 6 shows S($x$), single original substitution table 120, used to generate split masked substitution tables 122, 124, 126, 128 (sm($x$), sm'($x$), sm"($x$), s'"($x$), respectively). The approach to generation of these split masked tables is similar to that shown in FIG. 5. However, there are three sets of random values used and as is shown, the entries in the generated split masked substitution tables are 32-bit words. In the example of FIG. 6, this is shown by the generation of three sets of random values r1($x$), r2($x$) and r3($x$) (at generator 130) and the generation of a random value m (at generator 132). As was the case with the example of FIG. 5, each entry S[x] in original substitution table 120 is masked with each of the generated random values. In the case of FIG. 6 this means that the S[x] value is exclusive or'ed (at 134) with each of r1[x], r2[x] and r3[x]. The resulting data word 136 therefore has the value r1[x]^r2[x]^r3[x]^S[x]. The mask value m is masked with each r1[x] value (exclusive or 138) to give data word 140 with value r1[x]^m. Random values r2($x$) and r3($x$) are used without masking as shown by data words 142, 144, respectively.

The generation of 32-bit data word split masked substitution tables 122, 124, 126, 128 is carried out in a manner analogous to that described above with reference to FIG. 5. In the example of FIG. 6, however, there are four data words (136, 140, 142, 144) which are each split into 8-bit bytes for concatenation to generate the data words for the split masked tables. Consequently, there will be a 32-bit word generated for each of the split masked substitution tables in the approach shown in FIG. 6.

Specifically, as is shown at 150, the first eight bits of each of data words 136, 140, 142, 144 are combined to provide the appropriate entry in split masked substitution table 122. The entry generated in sm($x$) is defined as shown in data word 152: the entry is the concatenation of the first eight bits of r1[x]^r2[x]^r3[x]^S[x], of r1[x]^m, of r2[x], and of r3[x]. Similarly, entries for split masked substitution tables 124, 126, 128 are defined by data words 154, 156, 158 which reflect the concatenations of the second, third and fourth 8-bit portions of r1[x]^r2[x]^r3[x]^S[x], of r1[x]^m, of r2[x], and of r3[x], respectively, as shown in FIG. 6 (portions from data words 136, 140, 142 and 144). The result of splitting and subsequent concatenating of the data words 152, 154, 156, 158 is the set of split masked substitution tables 122, 124, 126, 128. As will be seen, these resultant tables each have a data word that is 32-bits in length.

As was referred to above, the examples in FIGS. 1 through 6 show a splitting and concatenation of the split values to generate split masked table entries. However, the preferred embodiment may also be implemented without using concatenation, so long as the split masked table entry contains split table entry bit pairs and those pairs are placed in defined locations in the entry so that a combination of the two split table entry pair values can be made to generate the correct masked substitution table entry bit. Furthermore the merging of the split values, illustrated in FIG. 2 and FIG. 3, may also be implemented using an alternative process to the use of the m5($x$) table where the alternative process acts to create the resulting value m^S[x]. For example, the shifting of the values by 16 bits and exclusive or operations could be used to produce the resulting value m^S[x] for the FIG. 1 arrangement, instead of using the m5($x$) table.

In the steps shown of FIGS. 5 and 6, the words of the resulting split masked table entries are generated using a portion of the original S-box table entry, masked by the different set of generated random r($x$) values, a portion of one of those values masked by the a first random m value, and a portion of the other generated r($x$) random values in the set. These split masked substitution tables may be used in a modified cryptographic process, in which copies of the input value for the cryptographic process is input into each of the generated set of split masked substitution tables.

The reassembly of the data at the conclusion of a cryptographic process using the split masked substitution tables as generated according to steps such as those of FIG. 5 or 6 will be carried out in a way analogous to that described for FIGS. 2 and 3. The table output values for the set of split masked substitution tables will be merged by a set of appropriately defined exclusive or operations. There will then be a further step in which the resulting bits are rearranged into their proper bit order, in accordance with the defined distribution arrangement used to place the bits into the entries in the split masked substitution tables. Similarly, refreshing of split masked substitution table entries may be carried out as is described with respect to the example of FIG. 4.

Various embodiments of the present invention having been thus described in detailed by way of example, it will be apparent to those skilled in the art that variations and modifications may be made without departing from the invention. The invention includes all such variations and modifications as fall within the scope of the appended claims.

A portion of the disclosure of this patent document contains material which is subject to copyright protection. The copyright owner has no objection to the facsimile reproduction by any one of the patent document or patent disclosure, as it appears in the Patent and Trademark Office patent file or records, but otherwise reserves all copyrights whatsoever.

I claim:

1. A computing device implemented method for executing a multiple split, masked substitution table cryptographic process comprising cryptographic steps based on a defined cryptographic process, the defined cryptographic process accepting an input, generating an output, and utilizing one or more originally-defined substitution tables; the cryptographic process accepting the input and generating a masked output equivalent to the output as masked by the mask value; the method comprising the steps of:

defining a mask value, generating, for each of the one or more originally-defined substitution tables, a set of two or more split, masked substitution tables for that originally-defined substitution table by masking data word entries in that originally-defined substitution table with a corresponding at least one random value data word and masking a one of the corresponding at least one random value data word with the mask value to form split table entries, and distributing bits of the split table entries according to a pre-determined distribution arrangement to form entries in the set of two or more split, masked substitution tables, the set of two or more split, masked substitution tables being usable in place of that originally-defined substitution table and the mask value in the cryptographic process, executing on the input the cryptographic steps by inputting copies of the input into the generated sets of split, masked substitution tables to generate a set of split, masked substitution table outputs, and combining the set of split, masked substitution table outputs to obtain the masked output equivalent to the output as masked by the mask value.

2. The method of claim 1 wherein the two or more sets of split, masked substitution tables comprises more than two tables and the corresponding at least one random value data word comprises a corresponding at least two random value data words, and wherein the generating step comprises:

generating, for each of the one or more originally-defined substitution table, a set of more than two split, masked substitution tables for that originally-defined substitution table by masking the data word entries in that originally-defined substitution table with the corresponding two or more random value data words and masking a one of the corresponding two or more random value data words with the mask value to form, along with the remainder of the corresponding two or more random value data words, split table entries, and distributing bits of the split table entries according to a pre-determined distribution arrangement to form entries in the set of two or more split, masked substitution tales.

3. The method of claim 1, further comprising the refresh step of refreshing each entry in each of the split, masked substitution tables upon the entry being accessed during execution of the cryptographic steps, the refresh step being accomplished by defining a random refresh data word and masking each bit in the split, masked substitution table entry by the appropriate bit in the random refresh data word.

4. The method of claim 1 in which the step of combining the set of split, masked substitution table outputs comprises a merge step followed by a reassembly step.

5. The method of claim 1, in which the step of generating the set of two or more split, masked substitution tables for that originally-defined substitution table comprises, for data word entries S[x], each entry S[x] having a defined word length in bits, the following steps:

defining n sets of random value data words r1(x) ... rn (x), each data word having bits with defined bit locations, each set of random value data words comprising data word entries such that data words r1[x], ... rn[x] correspond to entry S[x] in that originally-defined substitution table, and generating the set of two or more split, masked substitution tables corresponding to S(x) by, for each entry S[x], masking (134) the data word S[x] with corresponding data words r1[x], ..., rn[x] in the set of random values to define a masked data word (136) having bits with defined bit locations, masking the mask value with a selected value r1[x] of the corresponding set of random values to define a randomized mask data word for S[x], having bits with defined bit locations, and generating each of the entries in a split, masked substitution table by selecting bits from the masked data word, the randomized mask data word and, where the size n of the set of random values is 2 or more, the random value data words in the set other than the selected value r1[x], whereby each selected bit used to define each split, masked substitution table entry is selected from a correspondingly defined bit-location in its original data word, each of the bits in the entry in the split, masked substitution table being defined in accordance with a pre-selected pattern.

6. The method of claim 5 in which the selection of bits from the masked data word, the randomized mask data word and, where the size n of the set of random values is 2 or more, the random value data words in the set other than the selected value r1[x] is carried out by selecting contiguous bits from the said data words and the step of generating each of the entries in a split, masked substitution table comprises the step of concatenating the selected contiguous bits to form the entry.

7. The method of claim 6 in which the size n of the set of random values is 1 and the length of the masked data word and of the randomized mask data word is 32 bits, the selection of bits comprising the step of selecting the first 16 bits from the masked data word and from the randomized mask data word to form an entry in a first split, masked substitution table by concatenation and a further selection of bits comprising the step of selecting the second 16 bits from the masked data word and from the randomized mask data word to form an entry in a second split, masked substitution table by concatenation.

8. The method of claim 5, further comprising the step of refreshing each entry in each of the split, masked substitution tables upon the entry being accessed during execution of the cryptographic process, the refresh step being accomplished by defining a random refresh data word and masking each bit in the split, masked substitution table entry by the appropriate bit in the random refresh data word whereby each bit in the entry corresponding to a bit selected from the masked data word, the randomized mask data word and, where the size n of the set of random values is 2 or more the random value data words in the set other than the selected value r1[x], is masked with the same bit from the random refresh data word.

9. The method of claim 1 in which the defined cryptographic process is an AES or 3DES encryption or decryption process.

10. A computing device program product for carrying out a cryptographic process so as to resist cryptographic attacks, the computing device program product comprising a computing device usable storage medium having computing device readable program product code stored therein, said program code being executable by a processor of a computing device, apparatus and/or system for implementing the method of claim 1.

11. A computing device consisting of at least one of hardware and a combination of a processor and computing code stored on said device and executable by said processor, providing means for executing a multiple split, masked substitution table cryptographic process resistant to cryptographic attack, the cryptographic process comprising cryptographic steps based on a defined cryptographic process, the defined cryptographic process accepting an input, generating an output, and utilizing one or more originally-defined substitution tables; the cryptographic process accepting the input and generating a masked output equivalent to the output; the computing device comprising:

means for defining a mask value, means for generating, for each originally-defined substitution table, a set of two or more split, masked substitution tables for that originally-defined substitution table by masking data word entries in that originally-defined substitution table with a corresponding at least one random value data word and masking a one of the corresponding at least one random value data word with the mask value to form split table entries, and distributing bits of the split table entries according to a pre-determined distribution arrangement to form entries in the set of two or more split, masked substitution tables, the set of two or more split, masked substitution tables being usable in place of that originally-defined substitution table and the mask value in the cryptographic process, means for executing on the input, the cryptographic steps by inputting copies of the input into the sets of split, masked substitution tables to generate a set of split masked table outputs, and means for combining the set of split, masked substitution table outputs to obtain the output corresponding to the output of the defined cryptographic process as masked by the mask value.

12. The computing device of claim 11 wherein the corresponding at least one random value data word comprises a corresponding two or more random value data words and wherein the means for generating each set of two or more split, masked substitution tables is operative to mask the data word entries with the corresponding two or more random value data words and to mask a one of the corresponding two or more random value data words with the mask value to form, along with the remainder of the corresponding two or more random value data words, the split table entries.

13. The computing device of claim 11, in which the means for generating the set of two or more split, masked substitution tables for that originally-defined substitution table comprises, for data word entries S[x], each entry S[x] having a defined word length in bits, by carrying out the following steps:

defining n sets of random value data words $r1(x) \ldots rn(x)$, each data word having bits with defined bit locations, each set of random value data words comprising data word entries such that data words r1[x], ... rn[x] correspond to entry S[x] in that originally-defined substitution table, and generating the set of two or more split, masked substitution tables corresponding to S(x) by, for each entry S[x], masking (134) the data word S[x] with corresponding data words r1[x], ..., rn[x] in the set of random values to define a masked data word (136) having bits with defined bit locations, masking the mask value with a selected value r1[x] of the corresponding set of random values to define a randomized mask data word for S[x], having bits with defined bit locations, and generating each of the entries in a split, masked substitution table by selecting bits from the masked data word, the randomized mask data word and, where the size n of the set of random values is 2 or more, the random value data words in the set other than the selected value r1[x], whereby each selected bit used to define each split, masked substitution table entry is selected from a correspondingly defined bit-location in its original data word, each of the bits in the entry in the split, masked substitution table being defined in accordance with a pre-selected pattern.

14. The computing device of claim 11 in which the means for generating each of the entries in the split, masked substitution table, is further operative to select bits from the masked data word, the randomized mask data word and, where the size n of the set of random values is 2 or more, the random value data words in the set other than the selected value r1[x], by selecting contiguous bits from the said data words and the step of generating each of the entries in a split, masked substitution table comprises the step of concatenating the selected contiguous bits to form the entry.

15. A data processing system or network comprising at least one computing device, apparatus or system according to claim 11.

\* \* \* \* \*